United States Patent
Joachim et al.

(10) Patent No.: US 8,057,351 B2
(45) Date of Patent: Nov. 15, 2011

(54) PLANETARY GEAR DEVICE WITH TWO SUN GEARS HAVING DIFFERENT DIAMETERS

(75) Inventors: Franz-Josef Joachim, Bodolz (DE);
Karl Benkler, Garmisch-Partenkirchen (DE); Klemens Humm, Immenstaad (DE); Klaus-Peter Brenner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 985 days.

(21) Appl. No.: 11/941,158

(22) Filed: Nov. 16, 2007

(65) Prior Publication Data

US 2008/0280725 A1    Nov. 13, 2008

(30) Foreign Application Priority Data

Nov. 18, 2006   (DE) .......................... 10 2006 054 404

(51) Int. Cl.
*F16H 57/08* (2006.01)
(52) U.S. Cl. .......................................... 475/342; 74/458
(58) Field of Classification Search .................. 475/180, 475/198, 205, 207, 219, 221, 343, 344, 904, 475/342; 74/434, 437, 457, 458
See application file for complete search history.

(56) References Cited

U.S. PATENT DOCUMENTS

| | | | |
|---|---|---|---|
| 2,982,153 A * | 5/1961 | Albertson et al. ............ 475/104 |
| 4,651,588 A * | 3/1987 | Rouverol ....................... 74/462 |
| 4,754,661 A * | 7/1988 | Barnett ........................ 74/459.5 |
| 4,986,800 A | 1/1991 | Meffert et al. |
| 6,056,660 A | 5/2000 | Mimura |
| 6,120,407 A * | 9/2000 | Mimura ........................ 475/225 |
| 7,238,140 B2 * | 7/2007 | Gradu ........................... 475/221 |
| 2005/0166697 A1 | 8/2005 | Schnitzer |
| 2006/0105878 A1 * | 5/2006 | Wheals ......................... 475/221 |
| 2006/0172846 A1 | 8/2006 | Gassmann et al. |
| 2006/0219039 A1 * | 10/2006 | Vranish ......................... 74/462 |
| 2009/0062058 A1 * | 3/2009 | Kimes et al. .................. 475/344 |

FOREIGN PATENT DOCUMENTS

| | | |
|---|---|---|
| DE | 38 19 703 A1 | 12/1989 |
| DE | 39 41 719 A1 | 6/1991 |
| DE | 102 38 233 A1 | 3/2004 |
| DE | 10 2006 004 291 A | 10/2006 |
| EP | 0 844 416 A2 | 5/1998 |

OTHER PUBLICATIONS

Eugene A. Avallone, Marks' Standard Handbook for Mechanical Engineers, 1987, McGraw-Hill, 9th edition, 8-90-8-113.*

* cited by examiner

*Primary Examiner* — Justin Holmes
*Assistant Examiner* — Huan Le
(74) *Attorney, Agent, or Firm* — Davis & Bujold, P.L.L.C.

(57) ABSTRACT

A planetary gear device having two sun gears with different diameters that engage with double planet gears having a first gear teeth area, which interacts with the fist sun gear, and a second gear teeth area, which interacts with the second sun gear. The double planet gears are continuous helical gear wheels. The crown circle diameters of the gear teeth areas of the double planet gears and the crown circle diameters of the sun gears are adapted such that the pitch circle diameters between the double planet gears and the sun gears are arranged in the center between the crown circle diameters and the effective root diameters of the gear teeth areas of the double planet gears and the sun gears.

15 Claims, 4 Drawing Sheets

PLANETARY GEAR DEVICE WITH TWO SUN GEARS HAVING DIFFERENT DIAMETERS

This application claims priority from German Application Serial No. 10 2006 054 404.8 filed Nov. 18, 2006.

FIELD OF THE INVENTION

The invention relates to a planetary gear device with two sun gears having different diameters.

BACKGROUND OF THE INVENTION

A differential gear unit is known from EP 0 844 416 A2, which has a bevel gear differential with an input shaft and two output shafts. The input shaft is positively connected with a carrier bearing of a bevel gear differential via a bevel gearing, to be able to transmit torque from the input shaft, via the carrier bearing, to the output shafts connected with the bevel gear wheels of further bevel gear wheel pairs. In this case, an outgoing supply of driving torque is distributed equally to both output shafts.

In addition, a power path is provided between the carrier bearing and both output shafts, each of which features a planetary gear device with two sun gears, which have different diameters. The sun gears mesh with the double planet gears that are constructed with a first gear teeth area that interacts with a first sun gear and a gear teeth area into which the second sun gear meshes. The planet carrier of the double planet gears are positively connected with frictionally engaged shifting elements, the rotational speed of the planet carriers being variable depending on the transmission capacity of the shifting elements.

In the present description, the double planet gears of the planetary gear devices are each constructed with two gear wheels which are spaced apart from one another, a shaft area designed with a reduced diameter being provided between both gear wheels of a double planet gear.

The disadvantage of this type of double planetary gear design is the technical complexity that results in high manufacturing costs.

Therefore, the task of the present invention is based on providing a planetary gear device that can be manufactured in a simple and cost-effective manner.

SUMMARY OF THE INVENTION

The planetary gear device according to the present invention is designed with two sun gears with different diameters, each of which meshes with double planet gears that are constructed with a first gear teeth area that interacts with the first sun gear and a second gear teeth area into which the second sun gear meshes.

According to the present invention, the double planet gears are designed as continuous helical gear wheels, and the crown circle diameters of the gear teeth area of the double planet gears as well as the crown circle diameters of the sun gears are adapted to each other, so that the pitch circle diameter between the double planet gears and the sun gears is arranged in the center between the crown circle diameters and the effective root diameters of the gear teeth areas of the double planet gears and the sun gears.

The double planet gears designed as continuous helical gear wheels can be manufactured in a simple and cost-effective manner in a single work process, since, based on the continuous design, the first gear teeth area and the second gear teeth area have the same number of teeth and the teeth of the teeth areas basically have the same tooth shape.

The adaptation of the crown circle diameters of the gear teeth areas of the double planet gears to the crown circle diameters of the sun gears with different diameters before manufacturing both gear teeth areas by lathing makes manufacturing especially cost-effective.

In addition, compared to prior art planetary gears, the efficiency of the planetary gear device according to the present invention is improved by the crown circle diameters of the gear teeth areas of the double planet gears and the sun gears being adapted to one another, since the sliding speed is the same in the area of the tooth root and in the area of the tooth crown because of the central position of the pitch circle with respect to the crown circle and the effective root diameters and the friction for a given contact length between the double planet gears and the sun gears is minimized.

In an advantageous further development of the planetary gear device according to the present invention, a total contact ratio between the teeth of the sun gears and the teeth of the gear teeth areas of the double planet gears is greater than 1 in order to achieve uniform power transmission of the torque between the sun gears and the double planet gears.

In order to further reduce friction loss appearing during operation, another advantageous embodiment of the planetary gear device according to the present invention provides that the profile contact ratio between the gear teeth areas of the double planet gears and the sun gears is smaller than 1, preferably 0.7, with which, in a transverse section less than one tooth of a sun gear mesh when transmitting torque with one of the gear teeth areas of the double planet gears and a sliding portion between the teeth of the sun gears meshing with one another and the double planet gears is minimized in a simple way.

An especially favorable embodiment of the planetary gear device according to the present invention with respect to friction can be achieved, if the overlap ratio, i.e., the number of teeth pairs in contact across the gear teeth area, is at least 1.

In a further advantageous embodiment of the planetary gear device according to the present invention, the number of gear teeth of the double planet gears and the number of gear teeth of the sun gears exceed the number of gear teeth at which the gearings between the double planet gears and the sun gears respectively show maximum load capacity, with which the slide movement in the area of the paired gear tooth flanks under stress is reduced because of a small gear teeth module compared to conventional gear teeth pairs of planetary gears.

In order to reduce a so-called breakaway torque, which must be applied to change gear from standstill to a rotating condition and which is greater than the friction torque acting in a rotating condition, the double planet gears are helical and in an advantageous further development of the planetary gear device according to the present invention a rotary meshing sequence is provided for this purpose between the sun gears and the double planet gears. The latter measure results in that torque can only be transmitted between the sun gears and one of the planet gears, the double planet gears respectively meshing to transmit torque in a respectively successive rotary sequence with the sun gears. The reduction of the breakaway torque is achieved in the rotary meshing sequence by means of the superimposition of the stiffness gradients of the individual teeth meshes because the superimposition is accompanied by a minimization of the stiffness variations.

BRIEF DESCRIPTION OF THE DRAWINGS

Further advantages and advantageous further developments of the present invention result from the patent claims and the exemplary embodiment described below, in principle, with reference to the figures. The figures show:

DETAILED DESCRIPTION OF THE INVENTION

Figure 1:
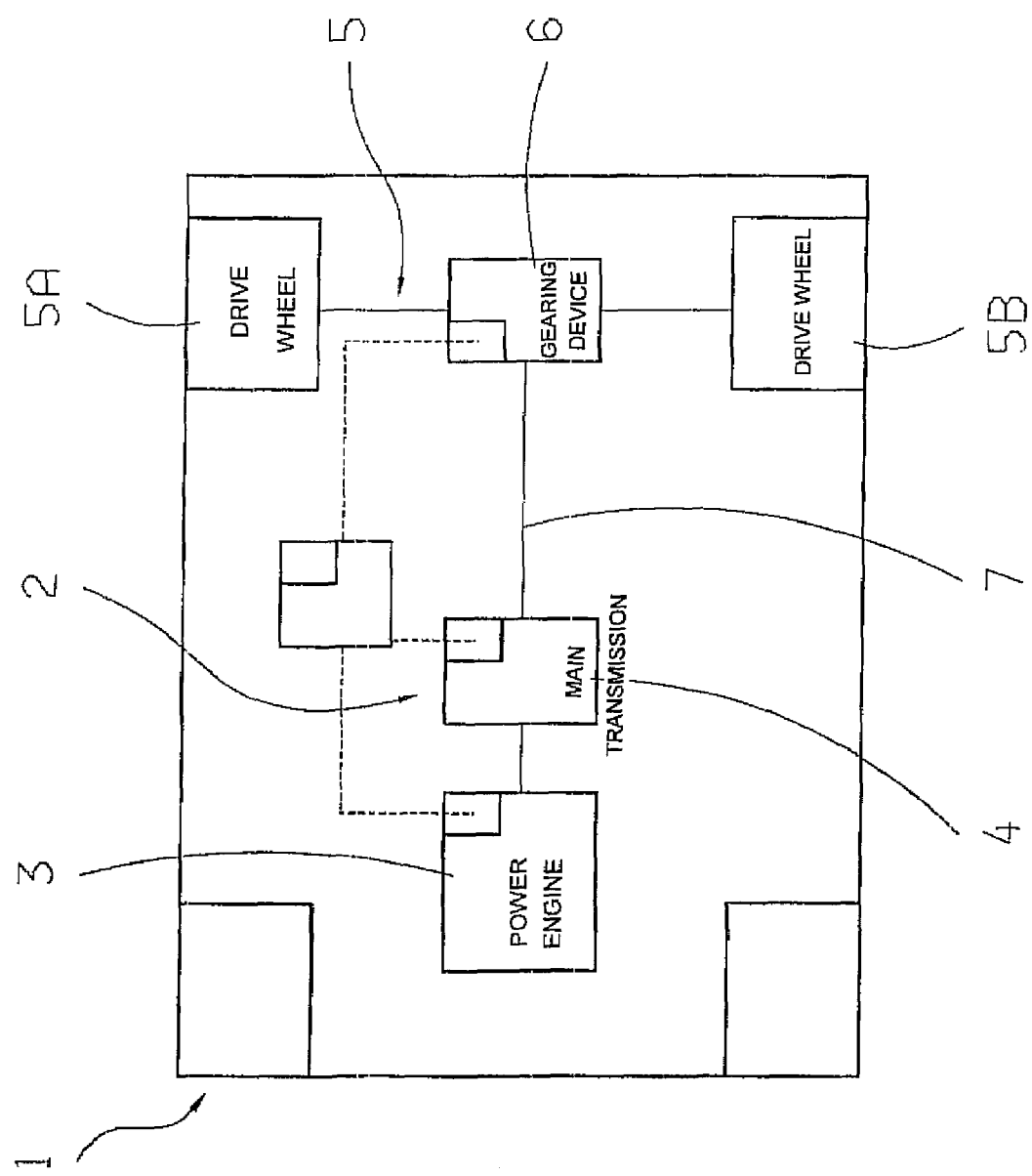
FIG. 1 is a schematic illustration of a vehicle.
Figure 2:
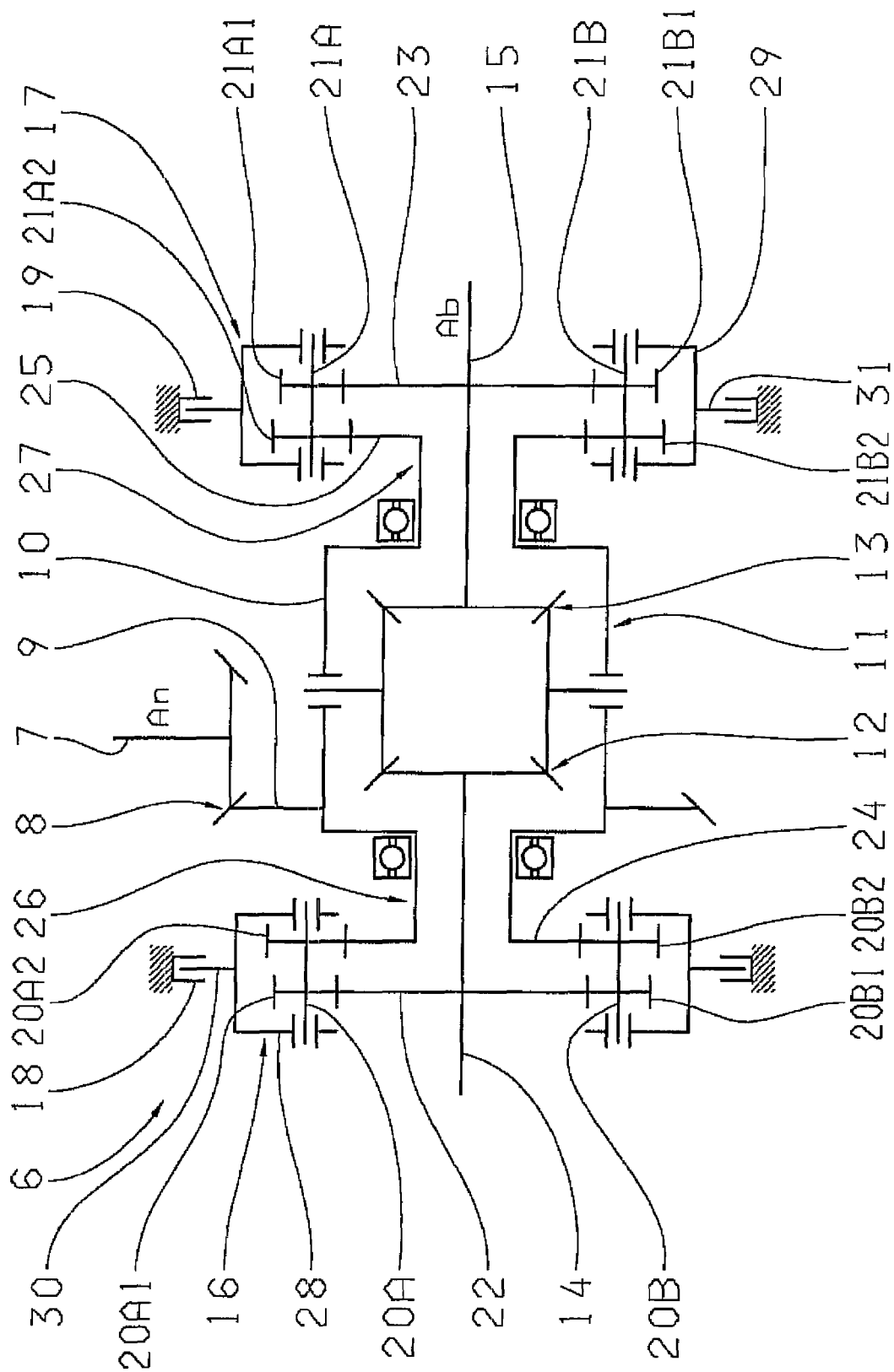
FIG. 2 is a gear diagram of a differential transmission which is designed with two planetary gear devices according to the present invention.

FIG. 1 shows a vehicle 1 with a power train 2. In the present description, the power train 2 includes a drive unit 3 and a main transmission 4 which can be a transmission of the type known from practice. In the exemplary embodiment shown in FIG. 1, the power engine 3 is designed as an internal combustion engine and in an advantageous further development it can be constructed as an electric motor or a hybrid power train. A gearing device 6 that is shown in more detail in FIG. 2 is arranged between the main transmission 4 that is provided for illustrating various gear transmission ratios and a vehicle drive axle 5, which is connected in a known manner with at least one drive wheel 5A, 5B on each side of the vehicle.

A driving torque of the drive unit 3 is transmitted via a longitudinal shaft 7 that is connected with a non-illustrated transmission output shaft of the main transmission 4 and can be introduced via a pair of bevel gear wheels 8 into the gearing device 6, one bevel gear wheel 9 of the pair of bevel gear wheels 8 being connected with a carrier bearing 10 of a gear device 6 of a known differential gearing device 11.

The carrier bearing 10 thus represents an input shaft of the gearing device 6 that is positively connected, via further pairs of bevel gear wheels 12, 13, with the output shafts 14, 15 of the gearing device 6, which in turn are positively connected with the drive wheels 5A, 5B.

A planetary gear device 16, 17 is arranged between the carrier bearing 10 and the each of the output shafts 14, 15 in the power path 26, 27, which shows a multiplication factor depending on the direction of a rotational speed difference between the drive wheels of the drive axle 5 of the vehicle. The multiplication factor of the planetary gear devices 16, 17 depends on the friction forces appearing during operation of the gear device 6 as well as their gear transmission ratios, the planetary gear device 16 or 17 assigned to the faster turning drive wheel 5A or 5B showing a lower multiplication factor than the planetary gear device 17 or 16, which is assigned to the slower drive wheel 5B or 5A. Thus, the degree of distribution of the torque between the two drive wheels 5A and 5B transmitted to the vehicle drive axle 5 varies as a function of the rotational speed-dependent multiplication factors of the planetary gear devices 16 and 17.

In addition, a frictionally engaged switch element 18, 19 designed as a brake in this description is assigned to the planetary gear devices 16 and 17, whereby the multiplication factors of the planetary gear devices 16 and 17 can be varied as a function of the transmission capacity of the switch elements 18, 19.

The planetary gear devices 16 and 17 respectively show several double planet gears 20A, 20B and 21A, 21B, only two double planet gears of the planetary gear devices 16 and 17 being illustrated in FIG. 2. The double planet gears 20A to 21B are constructed as continuous helical gear wheels that mesh respectively with a first gear teeth area 20A1, 20B1 and 21A1, 21B1 respectively with a first sun gear 22 or 23. In addition, the double planet gears 20A to 21B mesh with the second gear areas 20A2 and 20B2 and 21B1, 21B2 with the second sun gears 24, 25 respectively. In this case, the sun gears 22 and 23 are respectively connected in a rotationally fixed manner with the output shafts 14 and 15 and the sun gears 24 and 25 in a rotationally fixed manner with the carrier bearing 10, while planet carriers 28, 29 of the planetary gear devices 16 and 17 are, positively connected rotationally fixed manner with the disks 30, 31 of the brakes 18 and 19. Thus the planet carriers 28, 29 of the double planet gears 20A to 21B are positively connected with the brakes 18 and 19, so that the rotational speeds of the planet carriers 28, 29 vary as a function of the respectively adjusted transmission capacities of the brakes 18, 19.

With completely disengaged brakes 18 and 19, a driving torque of the drive unit 3 adjacent to the gear device 6 is transmitted equally, via the output shafts 14 and 15, to both drive wheels 5A and 5B along a longitudinal shaft 7, as in conventional differential gears.

Upon the appearance of a rotational speed difference between the drive wheels 5A and 5B or the probability of such a rotational speed difference, the transmission capacities of both switch elements 18 and 19 during the start up procedure of the vehicle 1 are set to values, so that most of the driving torque of the drive unit 3 transmitted to the vehicle drive axle 5 is conveyed, to an increased extent, to the slower rotating drive wheel, to the traction in the area of the drive wheels 5A and 5B of the drive axis of the vehicle.

The sun gears 22 and 23 as well as the sun gears 24 and 25 are designed in the same way in the present description, the sun gears 22 and 24 as well as the sun gears 23 and 25 being constructed with different diameters.

As embodiment of the double planet gears 20A to 21B is basically the same, only the double planet gear 20A will be addressed in the following description of FIG. 3.

Figure 3:
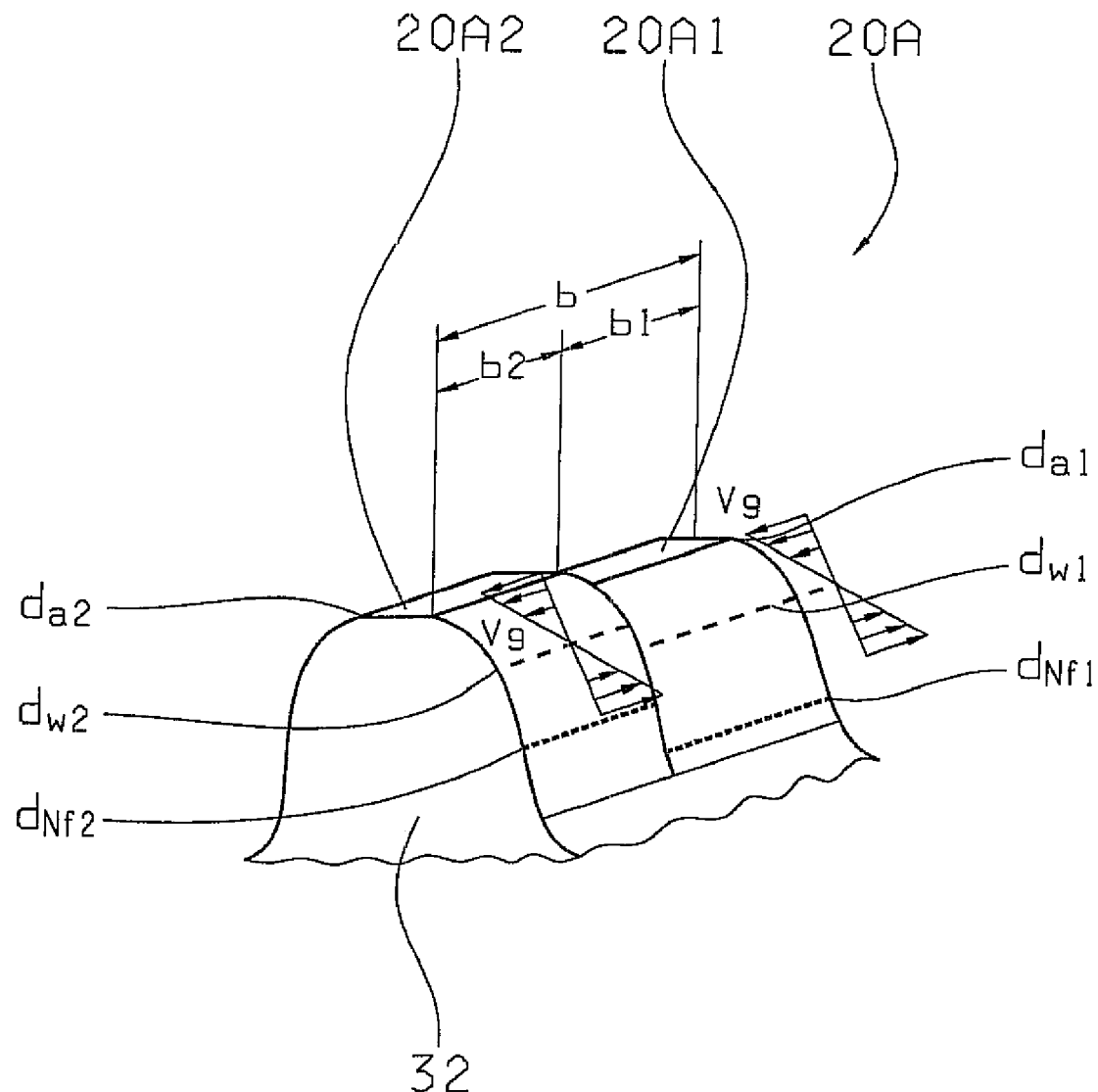
FIG. 3 is a schematic illustration of part of a double planet gear.

In FIG. 3, a tooth 32 of the double planet gear 20A is shown alone, schematically across its entire tooth width b. In this case, the width of the first gear teeth area 20A1 is designated more precisely with b1 and the width of the second gear teeth area 20A2 with b2.

As is apparent from FIG. 3, the tooth 32, which is designed in the same manner as the other teeth of the double planet gear 20A, shows the same tooth shape in the first gear teeth area 20A1 as in the second gear teeth area 20A2, a crown circle diameter $d_{a1}$ in the first gear teeth area 20A1 being smaller than the crown circle diameter $d_{a2}$ in the second gear teeth area 20A2.

Thus, the double planet gear 20A is designed in a stepped manner, the tooth profiles of the sun gears 22 and 24 meshing with the double planets 20A in the area of the crown circle diameters being adapted to the crown circle diameters $d_{a1}$ and $d_{a2}$ in the gear teeth areas 20A1 and 20A2 of the double planet gear 20A, so that the pitch circle diameters $d_{w1}$ and $d_{w2}$ between the double planet gear 20A and the sun gears 22 and 24 are arranged in the center between the crown circle diameters $d_{a1}$ and $d_{a2}$ and the effective root diameters $d_{Nf1}$ and $d_{Nf2}$ of the double planet gear 20A and the sun gears 22 and 24. Thus, a profile of the slide velocity $v_g$ illustrated in FIG. 3 develops in the area between the effective root diameters $d_{Nf1}$ and $d_{Nf2}$ in the gear teeth areas 20A1 and 20A2 and the crown circle diameters $d_{a1}$ and $d_{a2}$, the slide velocity, $v_g$, in the area of the pitch circle diameters $d_{w1}$ and $d_{w2}$ being equal to zero and the slide velocities in the area of the tooth base and the tooth crown being of the same size.

A total contact ratio between the teeth of the sun gears 22 and 23 and tooth 32 and the teeth of the double planet gear 20A respectively is larger than 1 to minimize friction, while a profile contact ratio that is formed by the quotient of the normal base pitch and the transverse normal base pitch between the gear teeth areas 20A1, 20A2 of the double planet gear 20A and the sun gears 22, 24 is smaller than 1, preferably equal to 0.7. Thus, less than one tooth of the double planet gear 20A meshes with the sun gears 22 and 24 in one transverse section. Since the double planet gear 20A is designed with a helical gearing and the total contact ratio is larger than 1, uniform power transmission is achieved in a simple manner. In addition, an overlap ratio, which corresponds to the number of tooth pairs meshing across the gear teeth areas b1 and b2 and the gear teeth areas 20A1 and 20A2 is at least 1 in order to guarantee a faultless kinematic transmission system.

Figure 4:
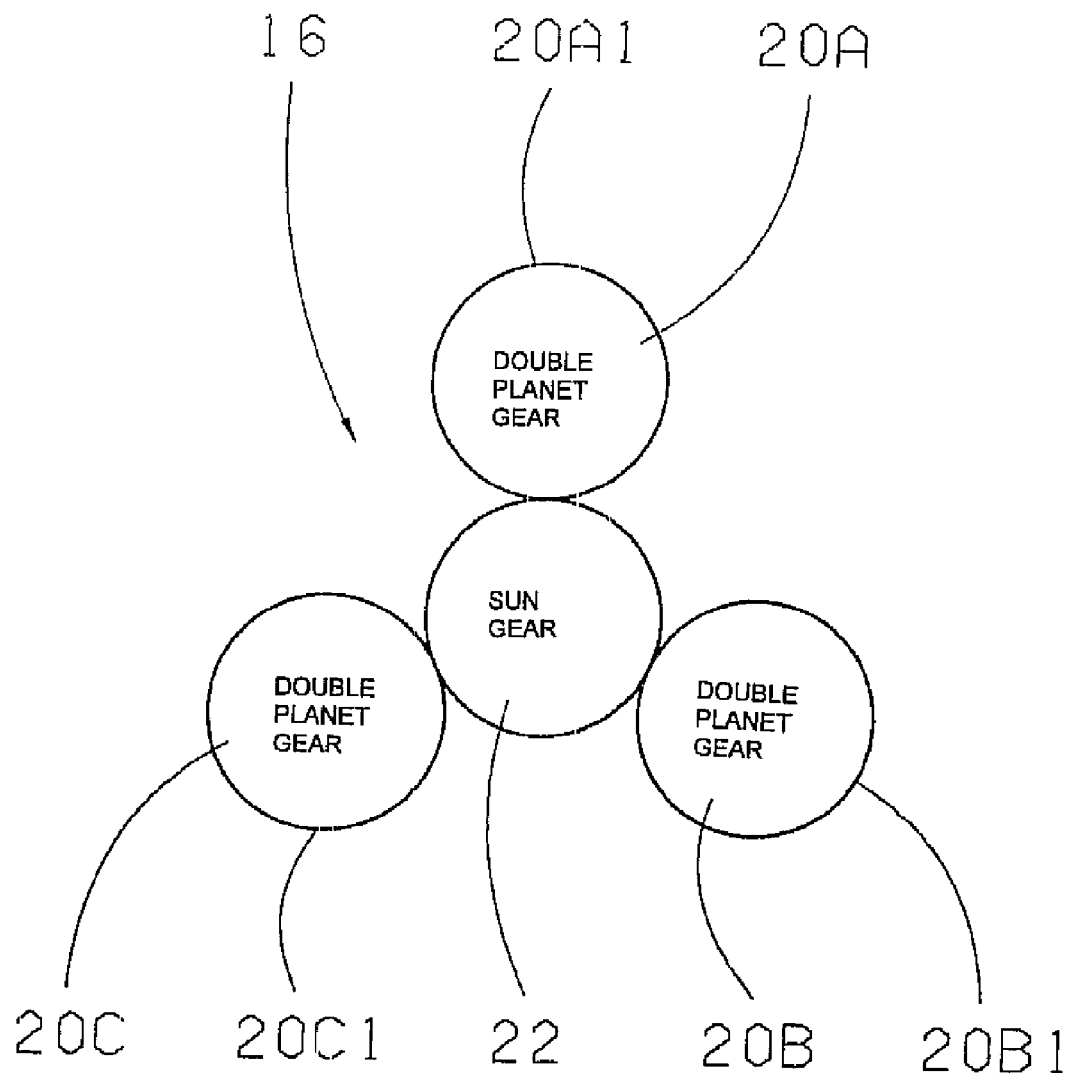
FIG. 4 is a side view of a schematic partial illustration of a planetary gear device according to the present invention.

The helical gearings of the planetary gear devices 16 and 17 show better synchronization properties than straight gearings and thus are characterized by more uniform breakaway torque and starting efficiency, the planetary gear devices 16 and 17 being characterized by a meshing sequence to reduce the breakaway torque that is described in more detail in FIG. 4.

FIG. 4 shows a strongly schematic side view of the planetary gear device 16 with three double planets 20A, 20B and 20C with their first gear teeth areas 20A1, 20B1 and 20C1 meshing with sun gear 22. In this case, the meshing between the double planet gears 20A to 20C and the sun gear 22 is provided so that torque can only be transmitted between one of the double planet gears 20A to 20C and the sun gear 22, the double planet gears 20A to 20C successively meshing in a torque transmitting manner in a rotary sequence with sun gear 22. This results in that the stiffness gradients of the individual gear teeth meshes are superimposed between the double planet gears 20A to 20C and the sun gear 22 and a minimal stiffness variation is achieved, the planetary gear device 16 being characterized by low breakaway torque.

In general, the planetary gear device according to the present invention shows double planet gears or stepped planets with an equal number of teeth for both the steps and gear teeth areas. To guarantee a high manufacturing quality, and thus a high load capacity, the double planet gears are designed with continuous gearings, which can be manufactured at low production costs. In order to implement the gearings between the double planet gears and the sun gears of the planetary gear device according to the present invention with a small gear teeth module, with a profile contact ratio smaller than 1, a total contact ratio larger than 1, as well as an overlap ratio which is at least 1 the crown circle diameters of the gear teeth areas of the double planet gears are designed offset and are optimized for meshing with both sun gears.

REFERENCE NUMERALS

1 Vehicle
2 Power train
3 Power unit
4 Main transmission
5 Vehicle drive axle
5A, B Drive wheels
6 Gear device
7 Longitudinal shaft
8 Pair of bevel gear wheels
9 Bevel gear wheel
10 Carrier bearing
11 Differential gear device
12, 13 Pair of bevel gear wheels
14, 15 Output shaft
16, 17 Planetary gear device
18, 19 Switch element
20A to 20C Double planet gear
20A1 to 20C1 First gear teeth area
20A2 to 21B2 Second gear teeth area
22 to 25 Sun gear
26, 27 Power path
28, 29 Planet carrier
30, 31 Disks
32 Tooth
b Tooth width
b1 Tooth width of first gear teeth area
b2 Tooth width of second gear teeth area
$d_a$ Crown circle diameter
$d_{Nf1}$ Effective root diameter
$d_{w2}$ Pitch circle diameter
$v_g$ Slide speed

The invention claimed is:

1. A planetary gear device (16, 17) comprising:
two sun gears (22 to 25) having different diameters, each of the sun gears meshing with double planet gears (20A to 21B) comprising a first gear teeth area (20A1 to 21B1) which interacts with a first sun gear (22, 24) and with a second gear teeth area (20A2 to 21B2) which meshes a second sun gear (23, 25),
the double planet gears (20A to 21B) being continuous stepped helical gear wheels and crown circle diameters ($d_{a1}$, $d_{a2}$) of the first and the second gear teeth areas (20A1 to 21B2) of the double planet gears (20A to 21B) and crown circle diameters of the sun gears (22 to 25) being adapted to one another so that pitch circle diameters ($d_{w1}$, $d_{w2}$), between the double planet gears (20A to 21B) and the sun gears (22 to 25), are arranged in a center between the crown circle diameters ($d_{a1}$, $d_{a2}$) and effective root diameters ($d_{Nf1}$, $d_{Nf2}$) of the gear teeth areas (20A1 to 21B2) of the double planet gears (20A to 21B) and the sun gears (22 to 25).

2. The planetary gear device according to claim 1, wherein a total contact ratio between teeth of the sun gears (22 to 25) and teeth (32) of the gear teeth areas (20A1 to 21B2) of the double planet gears (20A to 21B) are greater than one.

3. The planetary gear device according to claim 1, wherein a profile contact ratio between the gear teeth areas (20A1 to 21B2) of the double planet gears (20A to 21B) and the sun gears (22 to 25) is less than one.

4. The planetary gear device according to claim 1, wherein an overlap ratio between the sun gears (22 to 25) and the gear teeth areas (20A1 to 21B2) of the double planet gears (20A to 21B) is at least one.

5. The planetary gear device according to claim 1, wherein a number of teeth of the double planet gears (20A to 21B) and a number of teeth of the sun gears (22 to 25) respectively exceed a minimum number of teeth at which gearing between the double planet gears (20A to 21B) and the sun gears (22 to 25) show maximum load capacity.

6. The planetary gear device according to claim 1, wherein a rotary meshing sequence between the sun gears (22 to 25) and the double planet gears (20A to 21B) is provided so that torque is only transmitted between the sun gears (22 to 25) and one of the double planet gears (20A to 21B), the double planet gears (20A to 21B) meshing torque transmitting in a successive, rotary sequence with the sun gears (22 to 25).

7. The planetary gear device according to claim 1, wherein the first and the second gear teeth areas on the double planetary gears have a common helix angle and a common handedness.

8. The planetary gear device according to claim 1, wherein the first and the second sun gears having different diameters.

9. The planetary gear device according to claim 1, wherein the first sun gear is connected, in a rotationally fixed manner, to an output shaft which is connected to a driven wheel, the second sun gear is connected, in a rotationally fixed manner, to a carrier bearing, and planet carriers of the double planetary gears are positively connected, in a rotationally fixed manner, to a brake disk.

10. The planetary gear device according to claim 1, wherein the planetary gear device includes at least three double planet gears.

11. A planetary gear set device comprising:

a first planetary gear device (16) comprising:

a first sun gear (22) of the first device (16) having a first diameter and a crown circle diameter and engaging a first gear teeth area (20A1) of a first double planetary gear (20A) of the first device (16), the first gear teeth area (20A1) of the first double planetary gear (20A) of the first device (16) having a crown circle diameter ($d_{a1}$) and an effective root diameter ($d_{Nf1}$), a pitch circle diameter ($d_{w1}$) of the first gear teeth area (20A1) being centrally located between the crown circle diameter ($d_{a1}$) and the effective root diameter ($d_{Nf1}$) of the first gear teeth area (20A1) and the first sun gear (22) of the first device (16);

a second sun gear (24) of the first device (16) having a second diameter and a crown circle diameter and engaging a second gear teeth area (20B1) of the first double planetary gear (20A) of the first device (16), the second gear teeth area (20B1) of the first double planetary gear (20A) of the first device (16) having a crown circle diameter ($d_{a2}$) and an effective root diameter ($d_{Nf2}$), a pitch circle diameter ($d_{w2}$) of the second gear teeth area (20A2) being centrally located between the crown circle diameter ($d_{a2}$) and the effective root diameter ($d_{Nf2}$) of the second gear teeth area (20A2) and the second sun gear (24) of the first device (16);

the first double planetary gear (20A) of the first device (16) being a continuous stepped helical gear wheel;

a second planetary gear device (17) comprising:

a first sun gear (23) of the second device (17) having a first diameter and a crown circle diameter and engaging a first gear teeth area (21A1) of a first double planetary gear (21A) of the second device (17), the first gear teeth area (21A1) of the first double planetary gear (21A) of the second device (17) having a crown circle diameter ($d_{a1}$) and an effective root diameter ($d_{Nf1}$), a pitch circle diameter ($d_{w1}$) of the first gear teeth area (21A1) being centrally located between the crown circle diameter ($d_{a1}$) and the effective root diameter ($d_{Nf1}$) of the first gear teeth area (21A1) and the first sun gear (23) of the second device (17);

a second sun gear (25) of the second device (17) having a second diameter and a crown circle diameter and engaging a second gear teeth area (21B1) of the first double planetary gear (21A) of the second device (17), the second gear teeth area (21B1) of the first double planetary gear (21A) of the second device (17) having a crown circle diameter ($d_{a2}$) and an effective root diameter ($d_{Nf2}$), a pitch circle diameter ($d_{w2}$) of the second gear teeth area (21A2) being centrally located between the crown circle diameter ($d_{a2}$) and the effective root diameter ($d_{Nf2}$) of the second gear teeth area (21A2) and the second sun gear (25) of the second device (17); and the first double planetary gear (21A) of the second device (17) being a continuous stepped helical gear wheel.

12. The planetary gear set device according to claim 11, wherein the first and the second gear teeth areas on the first double planetary gears have a common helix angle and a common handedness.

13. The planetary gear set device according to claim 12, wherein the first and the second sun gears having different diameters.

14. The planetary gear set device according to claim 13, wherein the first sun gears are connected, in a rotationally fixed manner, to an output shaft which is connected to at least one driven wheel, the second sun gears are connected, in a rotationally fixed manner, to a carrier bearing, and planet carriers of the double planetary gears are positively connected, in a rotationally fixed manner, to a brake disk.

15. The planetary gear device according to claim 14, wherein the planetary gear set device includes at least four double planet gears.

* * * * *